Figure 1:
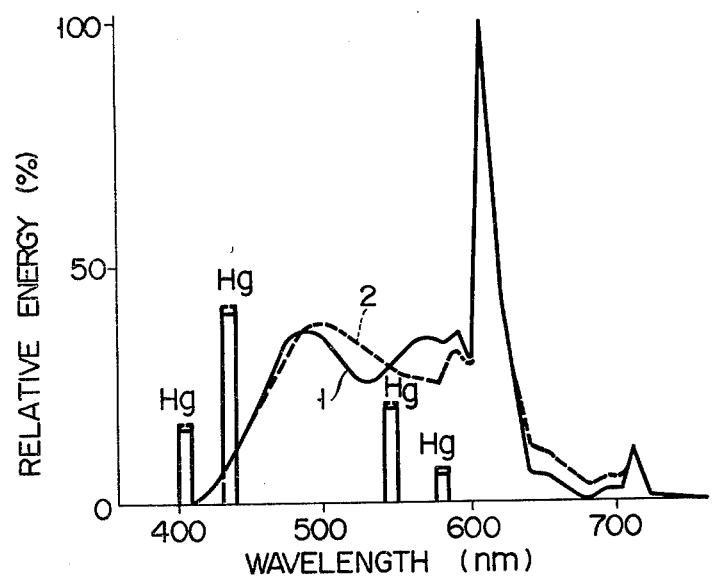

United States Patent [19]

Akiyama et al.

[11] 4,199,707
[45] Apr. 22, 1980

[54] FLUORESCENT LAMP

[75] Inventors: Junetsu Akiyama, Yokohama; Takayoshi Fuchida, Tokyo; Akira Taya, Kawasaki; Kazunori Nagafuchi, Shime; Kohtaro Kohmoto, Yokohama; Tomohiko Kobuya, Kawasaki, all of Japan

[73] Assignee: Tokyo Shibaura Denki Kabushiki Kaisha, Kawasaki, Japan

[21] Appl. No.: 938,096

[22] Filed: Aug. 29, 1978

[30] Foreign Application Priority Data

Aug. 30, 1977 [JP] Japan ................................ 52-103190

[51] Int. Cl.$^2$ ............................................. H01J 61/44
[52] U.S. Cl. .................................................... 313/487
[58] Field of Search ........................................ 313/487

[56] References Cited

U.S. PATENT DOCUMENTS

| | | | |
|---|---|---|---|
| 3,858,082 | 12/1974 | Thornton, Jr. | 313/487 |
| 3,937,998 | 2/1976 | Verstegen et al. | 313/487 |
| 4,088,923 | 5/1978 | Manders | 313/487 |

*Primary Examiner*—Palmer C. Demeo
*Attorney, Agent, or Firm*—Oblon, Fisher, Spivak, McClelland & Maier

[57] ABSTRACT

A fluorescent lamp which comprises a vacuum-tight envelope provided with electrodes between which discharge takes place during the operation of said fluorescent lamp. The envelope is coated on the inside with a phosphor composition layer comprising: a first light-emitting material having an emission spectrum with a peak in the wavelength range between 465 and 490 nm, or preferably between 480 and 490 nm, and a half width ranging from 30 to 120 nm, or preferably from 70 to 100 nm; a second light-emitting material having an emission spectrum with a peak in the wavelength range between 550 and 580 nm, or preferably between 560 and 570 nm, and a smaller half width than 110 nm; a third light-emitting material having an emission spectrum with a peak in the wavelength range between 600 and 620 nm, or preferably between 610 and 620 nm; and a fourth light-emitting material having an emission spectrum with a peak in the wavelength range between 480 and 500 nm, or preferably between 480 and 490 nm, thereby ensuring high luminous flux and satisfactory color rendering.

3 Claims, 8 Drawing Figures

FLUORESCENT LAMP

This invention relates to a fluorescent lamp whose color temperature ranges between 2800 and 5000 K., and which ensures high luminous efficacy and satisfactory color rendering.

A fluorescent lamp has been used as a general source of illumination light for many years. Much progress has been made in respect of both luminous efficacy and color rendering through improvements in both the construction of the fluorescent lamp and the development of new phosphor materials. In particular calcium halophospate phosphor, activated by manganese and antimony, provides high luminous efficacy and a certain degree of color rendering. This phosphor has a low manufacturing cost and is now used with almost all types of fluorescent lamps for general illumination purposes. Therefore, a fluorescent lamp using the above-mentioned calcium halophosphate phosphor represents a highly efficient type.

As described above, however, a fluorescent lamp provided with the calcium halophosphate phosphor and activated by Mn or Sb still fails to ensure fully satisfactory color rendering. To date, numerous improvements have been attempted to eliminate this drawback. A typical improvement is represented by a phosphor composition set forth in the Japanese patent publication No. 32759/1975. This proposed composition intends to improve the color rendering of the ordinary fluorescent lamp by replenishing the insufficient radiation energy of the red range of the above-mentioned calcium halophosphate phosphor. It has been found, however, that this improvement has to be made at a great sacrifice to the high luminous efficacy characteristics of a fluorescent lamp using calcium halophosphate phosphor that is activated by Mn and Sb. Therefore, the phosphor composition proposed in the aforesaid Japanese patent publication No. 32759/1975 is restricted in application.

On the other hand, it is known that it is possible to ensure satisfactory color rendering by applying a phosphor composition whose emission spectral distribution indicates three peak lines, namely, one line wavelength range between 455 and 485 nm, one line wavelength range between 525 and 560 nm, and one line wavelength range between 595 and 620 nm. The light of the above-mentioned phosphor composition at a color temperature of 2300 to 6800 K., has a general color rendering index value that is higher than Ra 79. A fluorescent lamp using the above-described phosphor composition provides, as expected, very high luminous efficacy and satisfactory color rendering. A fluorescent lamp using a phosphor composition that includes a green emitting rare earth-activated phosphor such as $(Ce-Tb)MgAl_{11}O_{19}$ activated by terbium and a red-emitting rare earth-activated phosphor such as $(Y-Eu)_2O_3$ activated by europium, indicates a higher luminous efficacy than 80 lm/w and a larger color rendering index than Ra 85. However, a fluorescent lamp using a phosphor composition including such expensive rare-earth activated phosphors has the drawback that is far more costly than the one that uses halophosphate phosphor. Moreover, the blue range of this expensive phosphor composition consists of a phosphor whose emission spectral distribution indicates a 450 nm peak wavelength of low luminosity. This results in a decline in the luminous efficacy of a fluorescent lamp when operated in a particularly high color temperature range.

It is further known that a fluorescent lamp using a phosphor composition whose emission spectral distribution indicates a narrow half width region (where the energy intensity accounts for 50% or more of a maximum value) in three wavelength regions approaching 450 nm, 540 nm and 610 nm, can provide high luminous efficacy and satisfactory color rendering. The above-mentioned phosphor composition is for example, a mixture of $Eu^{2+}$-activated strontium chloroapatite phosphor, $Mn^{2+}$-activated zinc silicate phosphor and $Eu^+$-activated yttrium oxide phosphor. However, the $Eu^{2+}$-activated strontium chloroapatite phosphor reduces the luminous efficacy of the resultant fluorescent lamp and has low application resistance, e.g., oxidation resistance, during the manufacture of the fluorescent lamp. Moreover, the use of this phosphor leads to a decline with time in the luminous efficacy of the fluorescent lamp. Though providing high luminosity, the $Mn^{2+}$-activated zinc silicate phosphor is known to produce a noticeable decrease in the luminous efficacy in a fluorescent lamp. Moreover, this phosphor has low application resistance. It is therefore easily inferred that a fluorescent lamp using a mixture of the above-mentioned three phosphors as a light-emitting layer gives rise to changes in the color of emitted light during application.

It is accordingly the object of this invention to provide a fluorescent lamp of high luminous efficacy and satisfactory color rendering by using such phosphors as are free from drawbacks accompanying the prior art phosphors.

According to the invention, there is provided a fluorescent lamp which comprises a vacuum-tight envelope provided with electrodes between which discharge takes place during the operation of the fluorescent lamp. The envelope is coated on the inside with a phosphor composition comprising: a first light-emitting material having an emission spectrum with a peak in the wavelength range between 465 and 490 nm or preferably between 480 and 490 nm, and a half width ranging 30 to 120 nm, or preferably from 70 to 100 nm; a second light-emitting material having an emission spectrum with a peak in the wavelength range between 550 and 580 nm, or preferably between 560 and 570 nm, and a smaller half width than 110 nm; a third light-emitting material having an emission spectrum with a peak in the wavelength range between 600 and 620 nm, or preferably between 610 and 620 nm; and a fourth light-emitting material having an emission spectrum with a peak in the wavelength range between 480 and 500 nm, or preferably between 480 and 490 nm.

Figure 2:
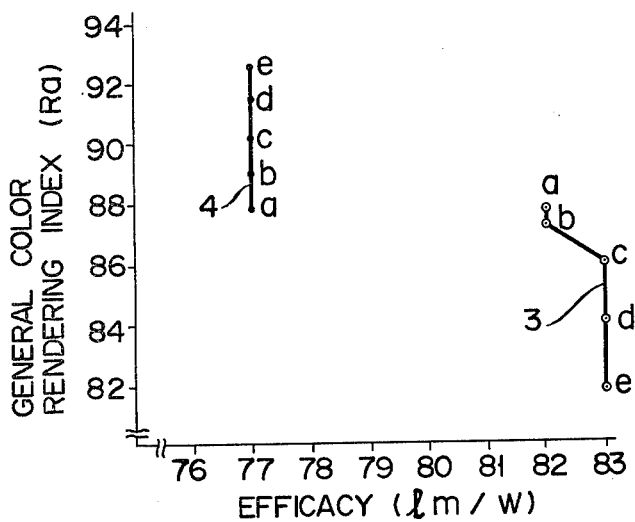
Figure 3:
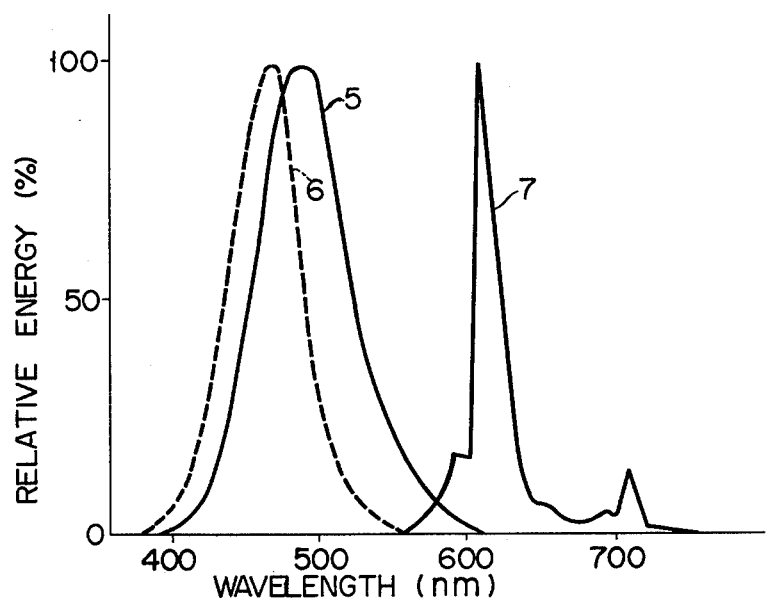
Figure 4:
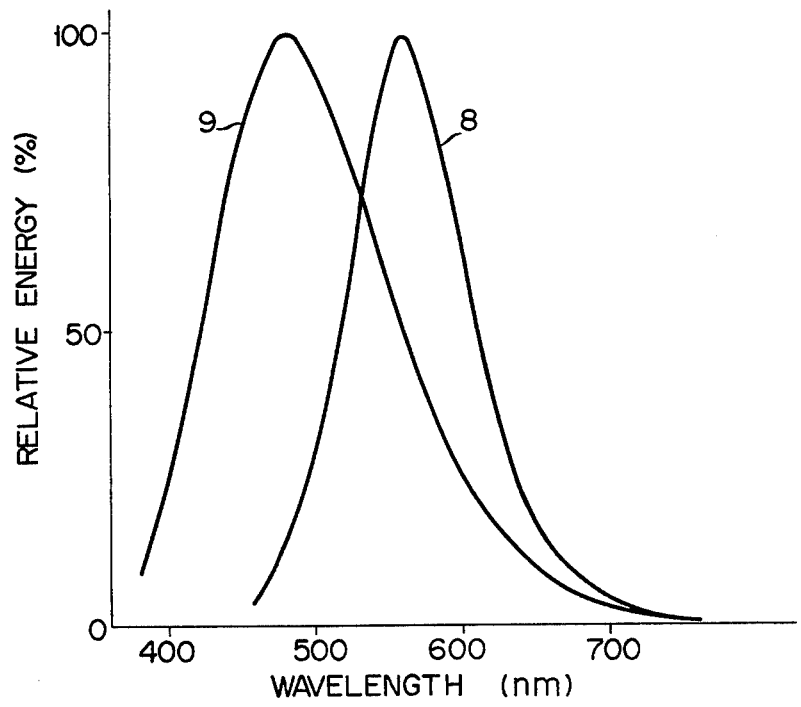
Figure 5:
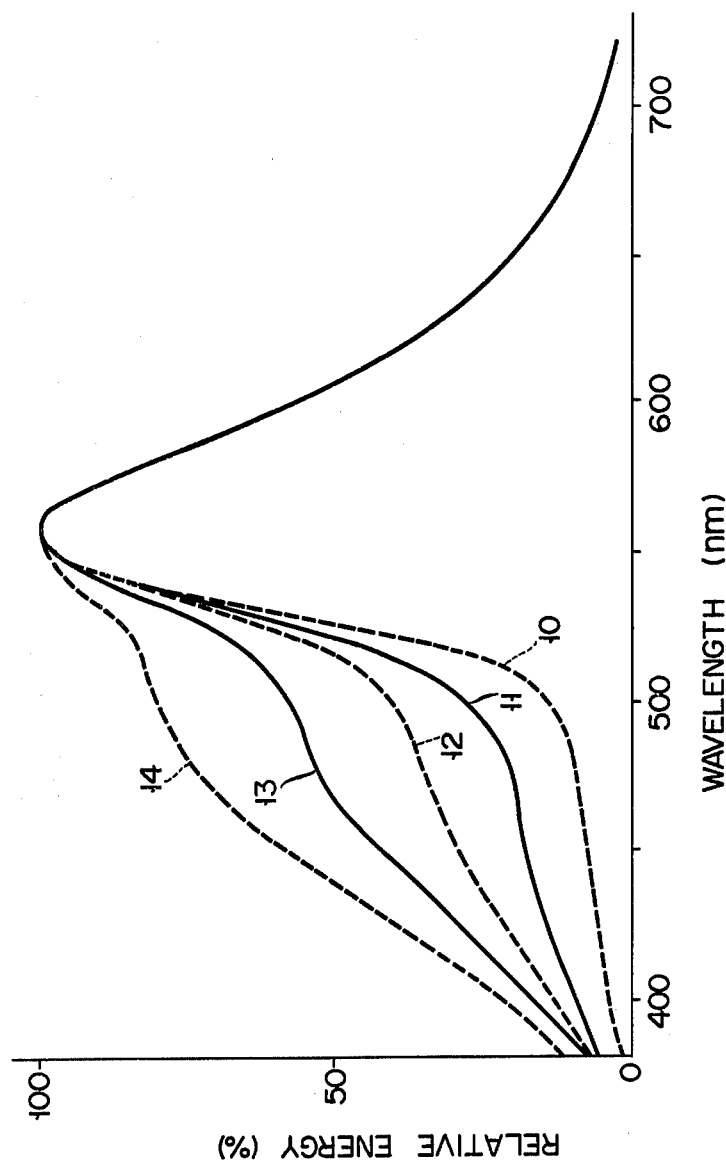
Figure 6:
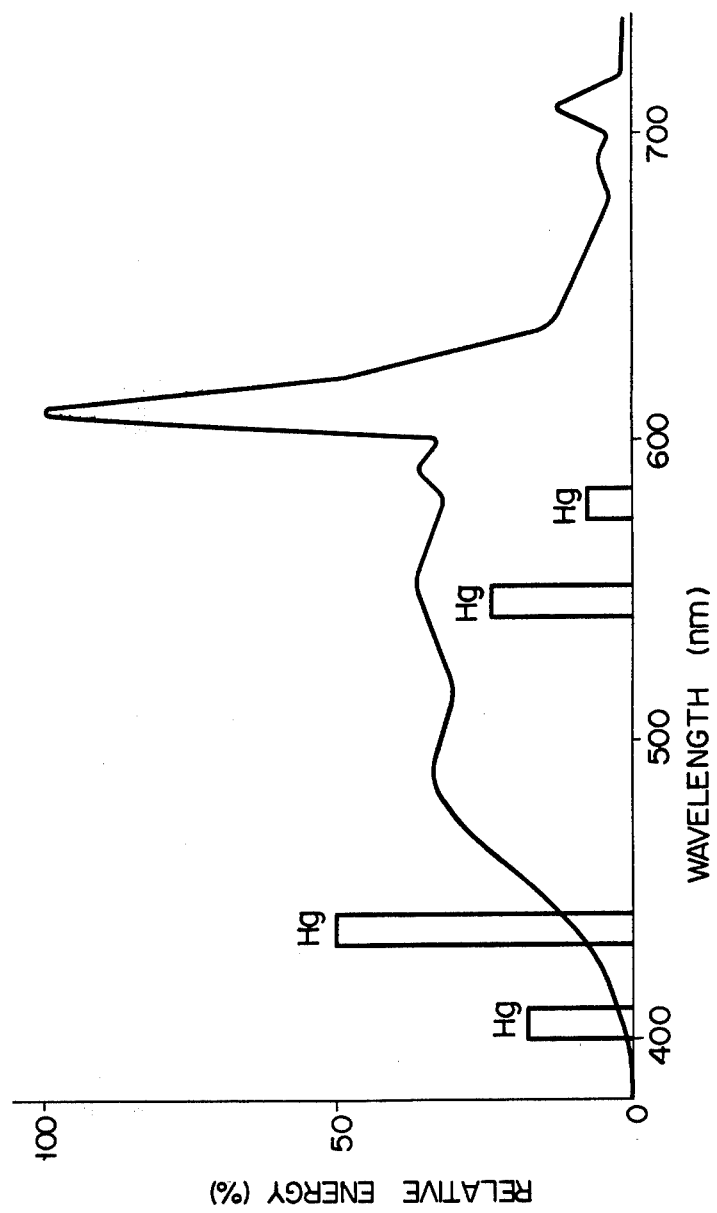
Figure 7:
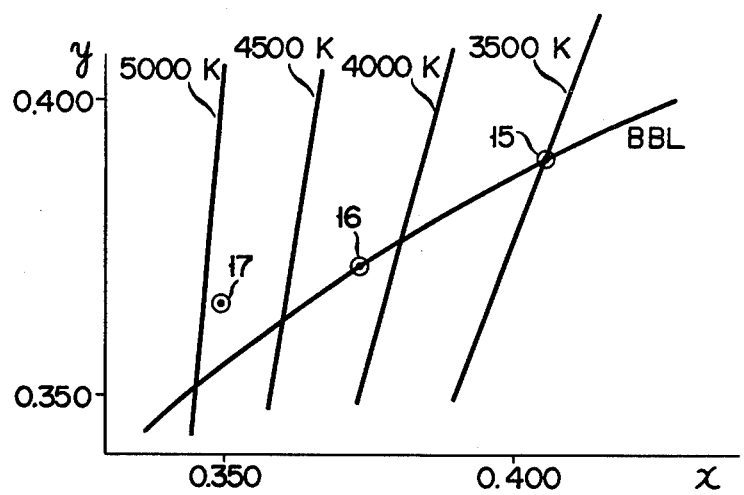
Figure 8:
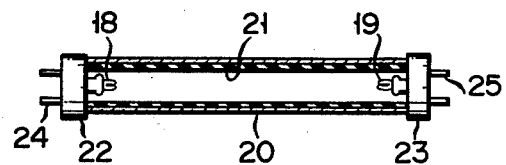

This invention can be more fully understood from the following detailed description when considered in conjunction with the accompanying drawings, in which:

FIG. 1 graphically shows the spectral energy distribution of a phosphor composition embodying this invention as calculated according to the principle of the invention;

FIG. 2 graphically sets forth the relationship between the luminous efficacy and general color rendering index of a fluorescent lamp in which the light-emission energy of the fourth constituent of the phosphor composition of the invention is increased or decreased;

FIGS. 3 and 4 graphically indicate the spectral energy distribution of each of the first thru fourth constituents of the phosphor composition of the invention;

FIG. 5 graphically illustrates the spectral energy distribution of a constituent of the phosphor composition of this invention which concurrently acts as the second and fourth constituents thereof;

FIG. 6 graphically shows the spectral energy distribution of a phosphor composition prepared in Example 3;

FIG. 7 is a CIE color diagram indicating the chromaticity of the phosphor compositions prepared in the respective examples; and FIG. 8 is a fractional sectional view of a fluorescent lamp constructed to embody this invention.

With a proper combination of emission spectra of a plurality of constituents of a phosphor composition, this invention intends to provide a fluorescent lamp which can display luminous efficacy and color rendering the same as or higher than those of a prior art fluorescent lamp using rare earth-activated phosphors as green and red-emitting materials. A satisfactory phosphor composition can be prepared without using a rare earth-activated phosphor for indicating a green emission spectrum having a very narrow wavelength range, if the phosphor composition is formed of three constituents, namely, a first constituent having a peak in the wavelength range between 465 and 490 nm, or preferably between 480 and 490 nm, and a half width ranging from 30 to 120 nm or preferably 70 to 100 nm; a second constituent having a peak in the wavelength range between 550 and 580 nm, or preferably between 560 and 570 nm, and a smaller half width than 110 nm; and a third constituent having a peak in the wavelength range between 600 and 620 nm or preferably between 610 and 620 nm.

FIG. 1 shows the spectral energy distribution of a fluorescent lamp using a phosphor composition prepared from three constituents having the above-mentioned different emission spectra. The energy distribution was determined by calculation based on the principle of this invention. Referring to FIG. 1. a solid line curve 1 denotes the spectral energy distribution of a fluorescent lamp providing a luminous efficacy of 82 lumens/watt at a color temperature of 4200 K. and a general color rendering index of Ra 88. A broken line curve 2 represents the spectral energy distribution of a fluorescent lamp having a luminous efficacy of 77 lumens/watt at the same color temperature of 4200 K. and a general color rendering index of Ra 88. The spectral energy distributions of FIG. 1 are realized by blending the three constituents of the phosphor composition in the proportions (c/o by weight) given in Table 1 below.

Table 1

| | 1st constituent (% by wt) | 2nd constituent (% by wt) | 3rd constituent (% by wt) |
|---|---|---|---|
| Curve 1 | 16 | 65 | 19 |
| Curve 2 | 14 | 67 | 19 |

Further, this invention provides a fluorescent lamp more improved in luminous efficacy or color rendering, particularly in the latter, by adding a fourth constituent having a peak in the wavelength range between 480 and 500 nm, or preferably between 480 and 490 nm, and a half width ranging between 100 and 110 nm. The line 3 of FIG. 2 indicates changes in the property of a fluorescent lamp where, with the color temperature (4200 K.) kept unchanged there was added to the phosphor composition, having a spectral energy distribution represented by the solid line curve 1 of FIG. 1, a fourth constituent whose proportion was progressively increased. The line 4 of FIG. 2 shows changes in the property of a fluorescent lamp, where, with the color temperature (4200 K.) kept unchanged, there was added to the phosphor composition, having a spectral energy distribution represented by the broken line curve 2 of FIG. 1, a fourth constituent whose proportion was progressively increased. The line 4 of FIG. 2 shows that the addition of the fourth constituent elevates the general color rendering of a fluorescent lamp. The line 3 of FIG. 2 proves that the addition of the fourth constituent increases the luminous efficacy of fluorescent lamps. The phosphor compositions corresponding to various points on the lines 3 and 4 of FIG. 2 are set forth in Table 2 below.

Table 2

| | 1st constituent (% by wt) | 2nd constituent (% by wt) | 3rd constituent (% by wt) | 4th constituent (% by wt) |
|---|---|---|---|---|
| line 3 a | 14 | 65 | 19 | 2 |
| b | 12 | 65 | 19 | 4 |
| c | 10 | 65 | 19 | 6 |
| d | 8 | 65 | 19 | 8 |
| e | 6 | 65 | 19 | 10 |
| line 4 a | 12 | 67 | 19 | 2 |
| b | 10 | 67 | 19 | 4 |
| c | 8 | 67 | 19 | 6 |
| d | 6 | 67 | 19 | 8 |
| e | 4 | 67 | 19 | 10 |

The following proves the efficacy of a phosphor composition embodying this invention:

(1) The emission spectrum of the green range of the phosphor composition of the invention indeed tends to indicate lower luminous efficacy than the emission spectrum of a green-emitting prosphor including the prior art rare earth activator with the phosphor composition of the invention, however, the high luminous efficacy of the bluish green emission spectrum which has a peak on the longer wavelength side than the prior emission spectrum, indicating a narrow half width peak in the proximity of a wavelength of 450 nm compensates, for the low luminous efficacy of the above-mentioned green emission spectrum;

(2) The bluish green emission spectrum of the phosphor composition of the invention contains an extremely small amount of mercury line spectrum energy having wavelength of 405 and 436 nm which presents great difficulties in improving the color rendering of a fluorescent lamp, thereby making a great contribution to the elevation of the color rendering.

The first constituent of a phosphor composition embodying this invention which is used with a fluorescent lamp is suitably formed of strontium chlorosilicate phosphor which is activated by divalent europium and whose peak wavelength lies near 490 nm and whose half width has a wavelength of about 70 nm. Other materials usable as the first constituent include calcium-magnesium silicate phosphor, strontium-magnesium silicate phosphor and barium silicate phosphor, all of which are activated by divalent europium. Particularly adapted as the third constituent is the known yttrium oxide phosphor which is activated by trivalent europium and whose peak wavelength lies near 610 nm. The second and fourth constituents may be formed of the known strontium halophosphate phosphor which is activated by divalent manganese and trivalent antimony and has the same properties as the conventional calcium halophosphate phosphor and yet is less expensive. With the above-mentioned strontium halophosphate phosphor, it is known that it is possible to change the peak ratio and peak wavelength of the Mn band and Sb band by varying the mixing ratio between Mn and Sb as well as between F and Cl. The variation of the peak ratio and peak wavelength of the Mn band and Sb band can provide strontium halophosphate phosphor concurrently acting as the second and fourth constituents which are adapted to be incorporated in the phosphor conposition of this invention.

The solid line curve 5 and broken line curve 6 of FIG. 3, respectively, denote the spectral energy distribution of strontium chlorosilicate phosphor and strontium magnesium silicate phosphor both activated by divalent europium and used as a first constituent (phosphor A). The solid line curve 7 of FIG. 3 represents the spectral energy distribution of yttrium oxide phosphor which is activated by trivalent europium and is used as a third constituent (phosphor C). The curves 8, 9 of FIG. 4, respectively, indicate the spectral energy distributions of the second and fourth constituents when determined separately. Referring to FIG. 5, the curves 10 thru 14 denote the spectral energy distributions of various forms of strontium halophosphate (phosphor B), prepared in the following examples, which concurrently acts as the second and fourth constituents.

This invention will be more fully understood from the following examples in which a fluorescent lamp is prepared from various phosphor compositions embodying the invention.

EXAMPLE 1

A phosphor composition was formed of: strontium chlorosilicate activated by divalent europium ($Sr_2Si_2O_8$-$2SrCl_2$/$Eu^{+2}$) (phosphor A); strontium halophosphate activated by manganese and antimony ($3Sr_3(PO_4)_2$-$SrF_2$/Sb, Mn) phosphor B in which the maximum radiation energy of the Sb band accounted for approximately 40% of that of the Mn band as shown by the curve 12 of FIG. 5, and the Mn band had a peak at a wavelength of 560 nm); and yttrium oxide phosphor activated by trivalent europium ($Y_2O_3$/$Eu^{+3}$) (phosphor C). The three phosphors A, B, C were mixed in such weight ratio that a light emission color indicated a chromaticity (X=0.405, Y=0.391) at point 15 of the CIE color diagram of FIG. 7. The phosphor composition thus prepared was deposited on the inner wall of a glass tube, 32 mm in inner diameter, to manufacture a 40 watt fluorescent lamp for trial by the customary process. The luminous efficacy and color rendering index of said fluorescent lamp were determined to be as follows:

Table 3

| Color temperature (K) | Luminous efficacy (lm/w) | Color rendering index (Ra) | Sb band/ Mn band (%) |
| --- | --- | --- | --- |
| 3500 | 83 | 84 | 40 |

EXAMPLE 2

A fluorescent lamp was manufactured for trial in substantially the same manner as in Example 1, except that the phosphor B was formed of strontium halophosphate activated by manganese and antimony ($3Sr_3(PO_4)_2$-$SrF_2$/Sb, Mn). The peak radiation energy of the Sb band accounted for approximately 10% of that of the Mn band as indicated by the curve 10 of FIG. 5, and the Mn band had a peak radiation energy at a wavelength of 560 nm. The properties of a fluorescent lamp thus prepared were measured to be as follows:

Table 4

| Color temperature (K) | Luminous efficacy (lm/w) | Color rendering index (Ra) | Sb band/ Mn band (%) |
| --- | --- | --- | --- |
| 3500 | 80 | 88 | 10 |

Comparison between Examples 3 and 4 shows that where light is emitted at a color temperature of 3500° K., color rendering is more improved as the radiation energy of the Sb band has a smaller ratio to that of the Mn band.

EXAMPLE 3

A phosphor composition was prepared by mixing the same three constituents (phosphors A, B, C), as used, in Example 1 in such weight ratio that a light emission color had a chromaticity (X=0.372, Y=0.372 at color temperature of 4200 K.) at point 16 of FIG. 7. A flourescent lamp was manufactured for trial from the above-mentioned phosphor composition in the same manner as in Example 1. The properties of the fluorescent lamp were determined to be as follows:

Table 5

| Color temperature (K) | Luminous efficacy (lm/w) | Color rendering index (Ra) | Sb band/ Mn band (%) |
| --- | --- | --- | --- |
| 4200 | 81 | 92 | 40 |

EXAMPLE 4

A phosphor composition was formed of strontium magnesium silicate activated by divalent europium ($Sr_2MgSi_2O_7$/$Eu^{+2}$) (phosphor A) whose peak radiation energy appeared at a wavelength of about 470 nm and whose half width had a wavelength of about 50 nm; and the same constituent, as in Example 3, concurrently acting as the phosphors B, C. These constituents were mixed in such weight ratio that a light emission color indicated the same chromaticity as in the phosphor composition of Example 3. A 40 watt fluorescent lamp was manufactured for trial from the phosphor composition of this Example 4 in the same manner as previously described. The properties of the fluorescent lamp were determined to be as follows:

Table 6

| Color temperature (K) | Luminous efficacy (lm/w) | Color rendering index (Ra) | Sb band/ Mn band (%) |
| --- | --- | --- | --- |
| 4200 | 82 | 87 | 40 |

EXAMPLE 5

A phosphor composition was formed of the same phosphors A, C as used in Example 4, and strontium halophosphate activated by manganese and antimony ($3Sr_3(PO_4)_2$-$SrF_2$/Sb, Mn) (phosphor B) in which the peak radiation energy of the Sb band accounted for approximately 60% of that of the Mn band and the Mn band had a peak of radiation energy at a wavelength of 560 nm. These constituents A, B, C were mixed in such weight ratio that a light emission color had a chromaticity (X=0.349, Y=0.365 at a color temperature of 4900 K.) at point 17 of FIG. 7. A 40 watt fluorescent lamp was manufactured for trial from the above-mentioned phosphor composition in the same manner as previously described. The properties of the fluorescent lamp were determined to be as follows:

Table 7

| Color temperature (K) | Luminous efficacy (lm/w) | Color rendering index (Ra) | Sb band/ Mn band (%) |
| --- | --- | --- | --- |
| 4900 | 80 | 88 | 60 |

The phosphor compositions prepared in Examples 1 thru 5 are collectively set forth in Table 8 below.

Table 8

| Example | phosphor A (% by weight) | Phosphor B (% by weight) | Phosphor C (% by weight) |
| --- | --- | --- | --- |
| 1 | 5 | 79 | 16 |
| 2 | 8 | 73 | 19 |
| 3 | 13 | 68 | 19 |
| 4 | 17 | 66 | 17 |
| 5 | 15 | 67 | 18 |

As seen from the foregoing Examples 1 thru 5, a fluorescent lamp using a phosphor composition of this invention, which is formed of the phosphors A, B, C, has properties the same as, or higher than those (for example, luminous efficacy 80 lm/w and color rendering index of Ra 85) of a fluorescent lamp using the prior art phosphor composition including a green-emitting rare earth-activated constituent. A fluorescent lamp of this invention using the prior art phosphor composition whose constituent of strontium halophosphate has a stable property is preferred for practical purposes. The phosphor composition of this invention, which does not contain expensive green-emitting rare earth-activated phosphor, offers a great advantage in reducing the manufacturing cost of a fluorescent lamp. A fluorescent lamp using the phosphor composition of this invention displays prominent effects at a color temperature of for example, 2800 to 5000 K.

In carrying out the object of this invention, a first constituent (phosphor A) may be prepared from other materials than those described in Examples 1 thru 5. Namely, it is possible to use, with the same effect, calcium-magnesium silicate phosphor activated by divalent europium ($Ca_3MgSi_2O_8/Eu^{+2}$) whose peak radiation energy appears in the proximity of a wavelength of 475 nm and whose half width has a wavelength of about 60 nm or barium silicate phosphor activated by divalent europium ($Ba_2Si_3O_8/Eu^{+2}$) whose peak radiation energy appears in the proximity of a wavelength of 485 nm and whose half width has a wavelength of about 90 nm.

For reference, the construction of a fluorescent lamp of this invention is indicated in FIG. 8. A glass tube 20 is lined with a film 21 of a phosphor composition embodying this invention which is formed of the first thru fourth constituents. Both ends of the glass tube 20 are fitted with mouthpieces 22, 23. Electrodes 18, 19 are led out by means of mouthpiece pins 24, 25.

What we claim is:

1. A fluorescent lamp which comprises a vacuum-tight envelope provided with electrodes between which discharge takes place while the fluorescent lamp is operated and a film of a phosphor composition layer lined on the inside of said vacuum-tight envelope comprising: silicate phosphor activated by divalent europium, which is selected from the group consisting of strontium chlorosilicate, calcium-magnesium silicate, strontium-magnesium silicate and barium silicate; strontium halophosphate phosphor activated by manganese and antimony; and, yttrium oxide phosphor activated by trivalent europium.

2. The fluorescent lamp according to claim 1 wherein said phosphor composition layer is comprised of a first light-emitting material, a second light-emitting material, a third light-emitting material, and a fourth light-emitting material; said first light-emitting material being of a silicate phosphor activated by divalent europium; said second light-emitting material being of strontium halophosphate phosphor activated by manganese and antimony; said third light-emitting material being of yttrium oxide phosphor activated by trivalent europium; and said fourth light-emitting material being of a strontium halophosphate phosphor wherein the mixing ratio of manganese and antimony differs from the ratio of manganese and antimony used with the strontium halophosphate phosphor in said second light-emitting material.

3. The fluorescent lamp according to claim 2 wherein the peak ratio and peak wavelength of the manganese and antimony vary by varying the mixing ration thereof; said second light-emitting material having an emission spectrum with a peak in the wavelength range between 550 and 580 nm and said fourth light-emitting material having an emission spectrum with a peak in the wavelength range between 480 and 500 nm.

* * * * *